No. 735,099. PATENTED AUG. 4, 1903.
J. HORMBY.
APPARATUS FOR SAWING IVORY NUTS.
APPLICATION FILED OCT. 25, 1902.
NO MODEL. 2 SHEETS—SHEET 1.
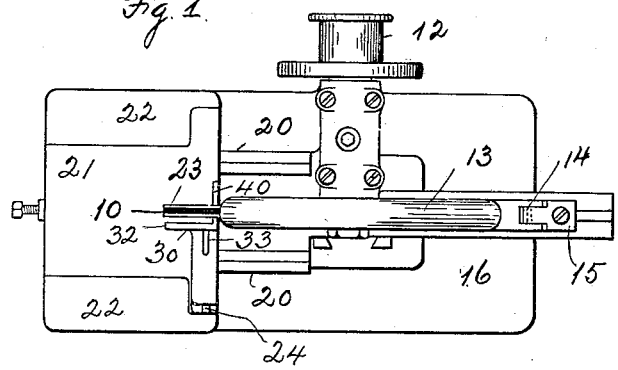
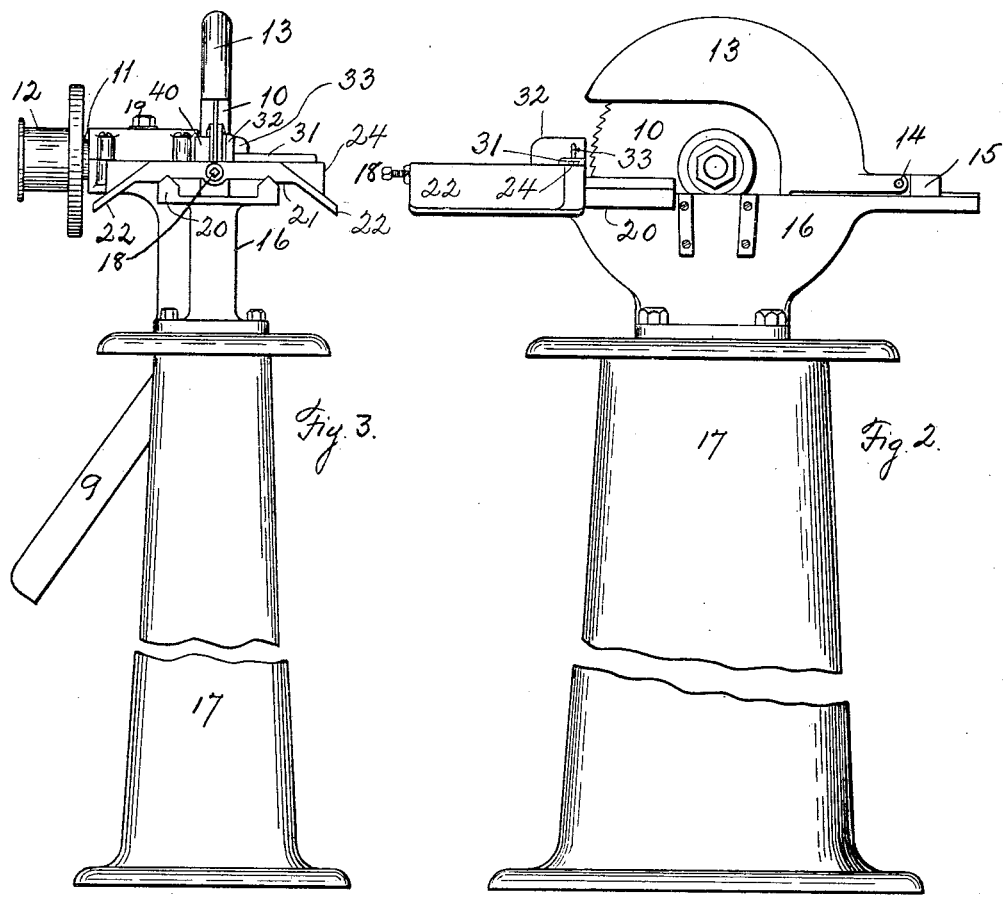
WITNESSES:
M. Hyndman
E. H. Boise
INVENTOR
John Hormby
BY William R. Baird
His ATTORNEY

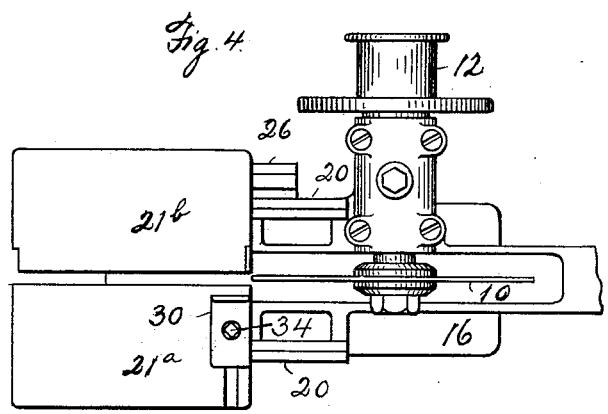
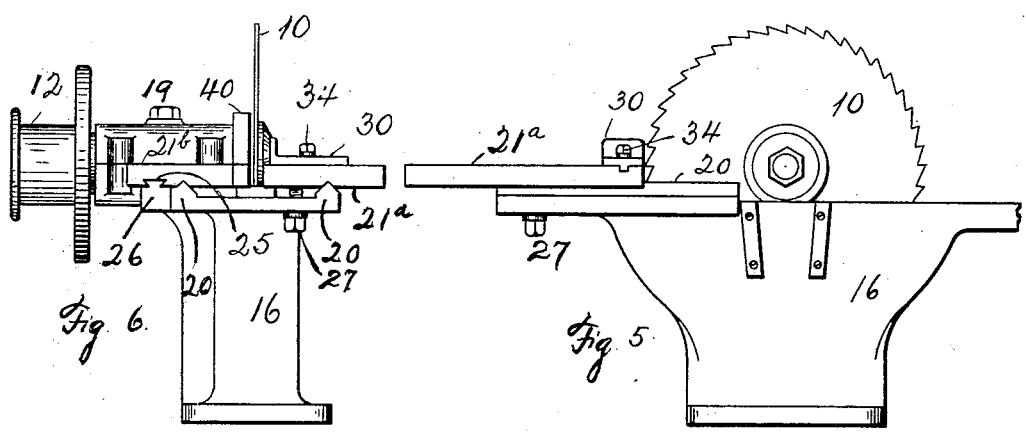

No. 735,099.

Patented August 4, 1903.

UNITED STATES PATENT OFFICE.

JOHN HORMBY, OF WOONSOCKET, RHODE ISLAND.

APPARATUS FOR SAWING IVORY NUTS.

SPECIFICATION forming part of Letters Patent No. 735,099, dated August 4, 1903.

Application filed October 25, 1902. Serial No. 128,705. (No model.)

*To all whom it may concern:*

Be it known that I, JOHN HORMBY, a citizen of the United States, and a resident of the city of Woonsocket, in the county of Providence and State of Rhode Island, have invented certain new and useful Improvements in Apparatus for Sawing Ivory Nuts, of which the following is a specification.

My invention relates to an apparatus for sawing ivory nuts; and its novelty consists in the construction and adaptation of the parts, as will be more fully hereinafter pointed out.

Heretofore two methods of sawing ivory nuts for the purpose of securing pieces suitable for the manufacture of buttons therefrom have been in vogue. These are the so-called "gage" method and "free-hand" method. When the gage method is employed, the operator uses a relatively thick and stout circular saw running in a vertical plane. A stationary gage is placed on a stationary saw-table at the right of and in front of the saw, and the nut is moved toward the saw. Little judgment is required for the sawing operation by this method, as the gage and saw are in fixed positions and determine the size of the pieces cut from the nut as it is moved toward the saw, and the slight rocking of the nut due to its ovoid form and the absence of flat surface does not affect a thick saw. This method produces pieces of substantially uniform thickness, and the labor employed is unskilled and cheap. When the free-hand method is employed, the operator uses a very thin flexible circular saw. He uses neither a gage nor a guard, but holds the piece of nut in his fingers as he guides it toward the cutting edge of the saw. This requires judgment and skill and higher-priced labor must be employed than with the gage method. Using a thin saw the operator can determine just where and how to cut, but must be careful how he handles the nut to prevent its rocking and causing the saw to buckle, and a skilled free-hand operator can commonly secure at least one more piece from the same nut than the unskilled operator by the gage method. The pieces made by the free-hand operator are not of uniform thickness. With my apparatus I unite the best features of both methods. I use a gage, as does the operator by the gage method; but the gage is freely movable laterally at right angles to the saw and is never fastened during its operation, the operator while sawing controlling its position with relation to the saw, for which reason I term it a "floating" gage. I also use a thin flexible saw, as in the free-hand method. I also make the saw-table movable in a direction at right angles to the movement of the gage, and I mount a small guard at its front edge to the left of the saw, and so guard the operator from injury. By the ability to make a proper adjustment, secured by the use of the gage, and the fact that my table, gage, and guard all move together in a direction parallel to the saw after the nut is in place I secure the ability to use a thin saw, as there is no danger of displacement of the nut or buckling of the saw when the parts move absolutely parallel to the cutting plane. Therefore while with my apparatus cheap and comparatively unskilled labor can be employed and not much judgment is required in the operator, yet by reason of the use of the appliances mentioned the operator can after little practice cut as many pieces out of the same nut as the free-hand operator.

In the drawings, Figure 1 is a top plan view of one form of my improved apparatus. Fig. 2 is a side elevation, and Fig. 3 a front elevation, of the same. Fig. 4 is a top plan view of the modified form of my improved apparatus, showing a saw-table made in two longitudinal sections and the hood of the saw removed; and Figs. 5 and 6 are side and end elevations of the same.

In the drawings, 10 is a saw vertically mounted upon a suitable shaft 11, actuated from a pulley 12 and provided with a hood 13, hinged at 14 to a stud 15, which in turn is secured to or made integral with a flat-topped base-plate 16, supported from a platform or standard 17, resting upon the floor. The saw-shaft is held against longitudinal play in its bearing by means of a set-screw 19, which engages in an annular groove in the shaft. (Not shown.) The sawdust from the nut passes down through a chute or spout 9. All of these parts are of usual construction and are well known to persons skilled in the art.

The base-plate 16 is provided with two longitudinal upwardly-projecting guide-plates 20 parallel with the plane of the saw and upon which is slidably mounted a saw-table 21, provided on each side with dependent wings 22 22 and limited in its movement toward the saw by an adjusting or set screw 18. The table is also provided with a central slot 23, adapted to receive the saw 10 at its edge nearest to the saw, and to the right of the slot 23 there is secured an upwardly-projecting guide-piece 24, on which is slidably mounted a gage 30 at right angles to the cutting plane of the saw.

The gage 30 consists of a flat plate 31, adapted to engage with a slide upon the guide-piece 24, a plate 32 at right angles to the plate 31 and the face of which is the part of the gage which is brought into contact with the nut, and an upwardly-projecting rib 33 to stiffen the gage and to serve as a handle by which it is moved. The details of the construction of the gage are quite immaterial, so long as it is slidably mounted upon the saw-table 21 to move in a transverse direction.

At the rear edge of the table and to the left of the slot 23 an upwardly-projecting guard-flange 40 is secured in any suitable manner and serves to prevent the nut from being pushed off the rear of the table.

The operation of the form of the apparatus which I have just described is as follows: The saw-table 21 is drawn back from the saw, as shown in Figs. 1 and 2. The nut is then placed upon the table, resting against the guard 40 at the rear and the gage-plate 32 at the right, the gage having been previously moved by the operator to the proper position for sawing the nut in half, when by holding the nut with one hand and the gage with the other, grasping the rib 33, the table is moved toward the saw until the nut is cut into two halves. The gage is now moved toward the saw to the position to gage the thickness to be cut, which may be determined by any suitable stop, (not shown,) and the table being again drawn back one of the pieces of the nut is placed upon it, resting against the guard 40 and gage-plate 32. The operator again grasps the nut and gage, as before described, and holding the gage by the rib 33 again moves the table, with the guard, gage, and nut, inward toward the saw until a slice of the proper width is severed. In these operations the operator uses the rib as a handle and with it holds the floating gage in place and moves the table. The gage moving with the table, the work is more steadily held, there being no friction between the work and the gage, as there is where the gage is secured to a stationary part.

In Figs. 4, 5, and 6 I have illustrated a modified form of my apparatus. In this form of the apparatus the saw-table 21 is made in two longitudinal sections, each mounted upon and adapted to slide upon the guide 20. The right-hand section 21$^a$ is, as before, provided with a transversely-movable gage 30, which, however, is provided with a binding-nut 34, so that it can be secured in place after adjustment. The section 21$^a$ may be held stationary, if desired, by means of a set-screw 27. The left-hand section 21$^b$ is slotted underneath at 25 and adapted to slidably engage an additional guide-piece 26, secured to the base-plate 16. This section 21$^b$, upon which is mounted the guard 40, can therefore move independently of the section 21$^a$. The apparatus as thus modified consists then of a longitudinally-movable saw-table section 21$^a$, provided with an adjustable gage, but one which can be fixed in place after adjustment, and a similar saw-table section 21$^b$, movable independently of the section 21$^a$ and provided with a guard 40. This form of the apparatus can be used with the old gage method, where the width of the piece to be cut is predetermined; but when the binding-nut 34 is loosened the width of the cut can be adjusted as before, and the fact that the section 21$^b$ can be moved to and from the saw secures an exact cut parallel with the cutting plane, which enables a thin saw to be employed.

What I claim as new is—

1. In an apparatus for sawing ivory nuts, the combination with the saw, of a movable table having a slot to receive the saw, a transverse guard on the table on one side of the cutting plane, and a transversely-movable gage on the table on the other side of the cutting plane.

2. In an apparatus for sawing ivory nuts, the combination with the saw, of a movable table made of two sections on opposite sides of the cutting plane with a slot between them to receive the saw, a transverse guard on one section, and a transversely-movable gage on the other section.

3. In an apparatus for sawing ivory nuts, the combination with a thin saw of a saw-table made in two longitudinal sections and each section being movable to and from the saw and one section being provided with means for moving it independently of the other section.

4. In an apparatus for sawing ivory nuts, the combination with a thin saw of a saw-table made in two longitudinal sections, each section being movable to and from the saw and one section being provided with means for moving it independently of the other section, the independently-movable section being provided with a guard and the other section with an adjustable gage.

Witness my hand this 15th day of October, 1902, at the city of Woonsocket, in the county of Providence and State of Rhode Island.

JOHN HORMBY.

Witnesses:
RALPH F. BUNKER,
CHAS. SPILL.